United States Patent
Schlumpf

(10) Patent No.: US 11,459,421 B2
(45) Date of Patent: Oct. 4, 2022

(54) WATER-SWELLABLE MOISTURE CURING ONE-COMPONENT POLYURETHANE SEALANT

(71) Applicant: SIKA TECHNOLOGY AG, Baar (CH)

(72) Inventor: Michael Schlumpf, Stallikon (CH)

(73) Assignee: SIKA TECHNOLOGY AG, Baar (CH)

( * ) Notice: Subject to any disclaimer, the term of this patent is extended or adjusted under 35 U.S.C. 154(b) by 507 days.

(21) Appl. No.: 16/487,467

(22) PCT Filed: Mar. 7, 2018

(86) PCT No.: PCT/EP2018/055652
§ 371 (c)(1),
(2) Date: Aug. 21, 2019

(87) PCT Pub. No.: WO2018/162582
PCT Pub. Date: Sep. 13, 2018

(65) Prior Publication Data
US 2019/0367663 A1    Dec. 5, 2019

(30) Foreign Application Priority Data
Mar. 7, 2017 (EP) .................................. 17159577

(51) Int. Cl.
*C08G 18/48* (2006.01)
*C08G 18/32* (2006.01)
*C08G 18/76* (2006.01)
*C08L 75/08* (2006.01)
*C08G 18/12* (2006.01)
*C09K 3/10* (2006.01)

(52) U.S. Cl.
CPC ......... *C08G 18/4837* (2013.01); *C08G 18/12* (2013.01); *C08G 18/3256* (2013.01); *C08G 18/4812* (2013.01); *C08G 18/4825* (2013.01); *C08G 18/7621* (2013.01); *C08L 75/08* (2013.01); *C09K 3/1021* (2013.01); *C08G 2190/00* (2013.01); *C09K 2003/104* (2013.01); *C09K 2200/023* (2013.01)

(58) Field of Classification Search
CPC ............ C08G 18/4837; C08G 18/3256; C08G 18/4812; C08G 18/4825; C08G 18/7621; C08G 18/12; C08G 2190/00; C08L 75/08; C09K 3/1021; C09K 2003/104; C09K 2200/023
See application file for complete search history.

(56) References Cited

U.S. PATENT DOCUMENTS

| | | | |
|---|---|---|---|
| 5,087,661 A | 2/1992 | Aoki et al. | |
| 5,500,475 A | * 3/1996 | Eicken | C08G 18/284 524/591 |
| 6,552,155 B1 | 4/2003 | Gutman et al. | |
| 2006/0052522 A1 | 3/2006 | Burckhardt et al. | |

FOREIGN PATENT DOCUMENTS

EP    0831107 A1    3/1998

OTHER PUBLICATIONS

Author Unknown, PubChem bulletin for Aluminum Sulfate, created date Aug. 8, 2005, pp. 1/50-50/50.*
Jul. 15, 2019 Office Action issued in European Patent Application No. 17159577.0.
May 24, 2018 International Search Report issued in International Patent Application No. PCT/EP2018/055652.
May 24, 2018 Written Opinion issued in International Patent Application No. PCT/EP2018/055652.

* cited by examiner

*Primary Examiner* — Patrick D Niland
(74) *Attorney, Agent, or Firm* — Oliff PLC

(57) ABSTRACT

A one-component moisture curing composition and a method for sealing construction joints against penetration of water. The one-component moisture curing composition includes at least one isocyanate-functional polyurethane polymer, at least one inorganic swelling agent selected from the group including aluminum sulfate and magnesium sulfate, and at least one hydrophilic aldimine of formula (I).

14 Claims, No Drawings

WATER-SWELLABLE MOISTURE CURING ONE-COMPONENT POLYURETHANE SEALANT

TECHNICAL FIELD

The invention relates to water-swellable moisture curing one-component polyurethane compositions and to a method for sealing construction joints against penetration of water.

BACKGROUND OF THE INVENTION

Water-swellable profiles and sealants are known. In the field of construction, they are used in watertight concrete structures for sealing of construction joints in basements and other below ground water structures. Such materials are also used to waterproof connecting joints in diaphragm walls as well as in pipe and steel work penetrations through walls and floor slabs. When contacted with water, these materials build up a swelling pressure inside of the construction. During the swelling the sealing material exerts pressure on the surrounding surfaces and seals the joint against water penetration.

State-of-the-art water-swellable profiles and sealants typically comprise a hydrophobic thermoplastic component and/or inert filler material blended with inorganic or organic swelling agent. Suitable inorganic swelling agents include for example water-absorbing clay minerals such as calcium bentonites. Examples of organic swelling components include water-swellable crosslinked polymers, which can be based on polyacrylates, such as superabsorbers, or polyurethane polymers. The water-swellable crosslinked polymers are water-insoluble but the polymer chains contain hydrophilic groups or hydrophilic segments, which are responsible for the water-absorbing properties.

The water-swellable sealants can be provided as reactive systems based on prepolymers containing reactive groups. The curing of the prepolymers can be initiated, for example, by heating or exposing the composition to atmospheric moisture or water after the application of the sealant to the substrate to be sealed. Moisture curable systems typically contain isocyanate-functional polyurethane prepolymers obtained from reaction of polyols with stoichiometric excess of polyisocyanates. When contacted with water the residual isocyanate groups of the polyurethane prepolymers form carbamic acid, which is unstable and decomposes into an amine and carbon dioxide. The amine reacts rapidly with other isocyanate groups to form urea linkages. The moisture curable sealant systems based polyurethane polymers can be formulated as one-part or as two-part systems, also called one-component or two-component systems, respectively.

The polyurethane polymers used as organic swelling agent in a water-swellable sealant must be at least partially hydrophilic in order to enable swelling upon contact with water. Typical isocyanate-functional polyurethane polymers are hydrophobic but hydrophilicity of the polyurethane polymer chain can be increased, for example, by adding hydrophilic segments or hydrophilic groups to the prepolymers or by using special additives in combination with hydrophobic prepolymers. The degree of swelling depends on the hydrophilic-hydrophobic balance in the polyurethane prepolymer. The more hydrophilic the prepolymer, the greater the extent to which it swells upon contact with an aqueous solution. However, crosslinking of completely water-soluble polyurethane prepolymers results in formation of hydrogels, which is not desired. Water-swellable sealants based on the use of hydrophilic polyurethane prepolymers are disclosed in the State-of-the-Art, for example in European patent application EP 0831107A1.

Water-swellable sealants used for sealing of construction joints are subjected to certain requirements, which are related to the long term stability and swelling properties of these materials during their intended use. Generally, the sealants should maintain their consistency, mechanical stability and swelling capabilities during the consecutive swelling and drying cycles over time periods of several years. In particular, the sealant should be mechanically sufficiently stable to resist deformation and washing out of the sealant while being subjected to flowing water. The material should preferably also maintain its properties at elevated temperatures and high humidity conditions. Finally, the sealant should exhibit a certain swelling delay, which means that the material should not immediately begin to absorb water but only after a certain period of time, such as 24 hours after the first contact with water.

It is furthermore essential that the water-swellable sealant does not form hydrogel upon contact with water. Hydrogels are three-dimensional polymeric structures, which are capable of absorbing and retaining large quantities of water to form a stable structure. Typically, hydrogels are formed by polymerizing a hydrophilic monomer in an aqueous solution under conditions such that the prepolymer becomes crosslinked, forming a three-dimensional polymeric network which gels the solution. Polyurethane based hydrogels can be obtained, for example, by reaction of hydrophilic, isocyanate-functional prepolymers and a large excess of water. Hydrogels have a high water-absorption capacity but they are also soft and, therefore, easily washed away from open surfaces when exposed to environmental conditions. Consequently hydrogels are mainly used in the field of construction as injections materials for sealing cracks and closed cavities in concrete structures.

The State-of-the-art water-swellable sealants have certain disadvantages, which make them less suitable for sealing construction joints. Water-swellable sealants containing high amounts of inorganic absorbents are known to suffer from increased swelling and consequently increased swelling pressure over long time periods due to the irreversibility of the absorption process. In case the swelling pressure exceeds a certain limit, cracks in the concrete surrounding the joint are likely to occur. On the other hand water-swellable sealants based solely on the use of organic swelling agents are incapable of retaining the absorbed water after the sealant is not any more in contact with water. In dry conditions, the absorbed water will begin to drain from the sealant resulting in drying and eventual embrittlement of the sealant material. If the sealant contains plasticizers, the consecutive absorption and desorption cycle can result in washing-off plasticizers and eventual degradation of concrete structures. Furthermore, some organic swelling agents such as hydrophilic polyurethane prepolymers typically have relatively high melting points, which prevent their use in low temperature applications. The use of hydrophilic polyols and/or polyisocyanates for the preparation of the hydrophilic polyurethane prepolymers also complicates the production process, since these components are difficult to dry and have to be protected from moisture during the production process.

There is thus a need for an improved water-swellable sealant, which solves the problems of the prior art sealants.

SUMMARY OF THE INVENTION

The object of the present invention is to provide a one-component moisture curing composition, which cures upon contact with atmospheric moisture forming a water-swellable sealant having good mechanical stability and swelling properties.

A still further objective is to provide a method for sealing construction joints against penetration of water.

It was surprisingly found that a one-component moisture curing composition containing at least one isocyanate-functional polyurethane polymer, at least one inorganic swelling agent and at least one hydrophilic aldimine is able to solve the problems related to State-of-the-art water-swellable moisture curing sealants.

With the hydrophilic aldimine alone the water-swellable sealant would be able to absorb high amounts of water but it would also be prone to shrinkage in dry conditions. Without the use of hydrophilic aldimine the amount of the inorganic swelling agent would have to be significantly increased in order to have the same water-swelling performance as with the use of the hydrophilic aldimine. Since the absorbed water would also be permanently trapped in the inorganic absorbent, the swelling degree of the sealant would increase over time as well as the pressure exerted to the concrete structure surrounding the sealed joint.

The subject of the present invention is a one-component moisture curing composition as defined in claim 1.

One of the advantages of the one-component moisture curing composition of the present invention is that at least part of the water absorbed in the water-swellable sealant is not desorbed from the sealant in dry conditions. Consequently, the plasticizers and other soluble additives possibly contained in the sealant are not washed away with the water flowing out of the sealant. In addition, the water-swellable sealant does not become brittle in dry conditions since part of the water is always retained in the inorganic swelling agent.

Another advantage of the one-component moisture curing composition of the present invention is that the water-swelling properties can be obtained without the use of long chain hydrophilic polyurethane prepolymers having high melting points. Consequently, the one-component moisture curing composition of the present invention is suitable for use also in low temperature applications. Furthermore, no hydrophilic polyols or polyisocyanates are used for the preparation of the polyurethane prepolymers, which enables the use of a simplified production process.

Still another advantage of the present invention is that the hydrophilic aldimine functions in the composition as a latent hardener. This enables a bubble free curing since the isocyanate groups of the prepolymer do not react with water but with the reactive groups of the aldimine and, therefore, the prepolymers are cured without the formation of carbon dioxide. It has also been found that the use of an aldimine hardener enables improved control of the curing reaction and production of sealants with the desired swelling delay.

Other aspects of the present invention are presented in other independent claims. Preferred aspects of the invention are presented in the dependent claims.

DETAILED DESCRIPTION OF THE INVENTION

The subject of the present invention is a one-component moisture curing composition comprising:
a) at least one isocyanate-functional polyurethane polymer,
b) at least one inorganic swelling agent selected from the group consisting of aluminum sulfate and magnesium sulfate, and
c) at least one hydrophilic aldimine of the formula (I);

wherein
m is 2 or 3,
A is a divalent or trivalent hydrocarbyl moiety containing ether groups and having average molecular weight in the range from 600 to 4,000 g/mol, preferably from 900 to 2,500 g/mol, and
Z is a monovalent $C_3$ to $C_{30}$ hydrocarbyl moiety optionally containing ether, carbonyl, ester, amido, urethane, urea or tertiary amino groups.

In this document, the term "one-component moisture curing composition" or "one-part moisture curing composition" refers to compositions, which are contained in a single moisture-tight container, has certain storage stability and which cures when exposed to moisture.

In this document, the term "latent hardener" refers to compounds containing at least two reactive groups, which are reactive towards isocyanate groups, the reactivity of which the at least two reactive groups is blocked and is activatable with moisture. The reactive groups of the latent hardener include all reactive groups, which show reactivity toward isocyanate groups after the activation with moisture.

In this document, the prefix "poly" in substance designations such as "polyol" or "polyisocyanate" refers to substances which in formal terms contain two or more per molecule of the functional group that occurs in their designation. A polyol, for example, is a compound having two or more hydroxyl groups, and a polyisocyanate is a compound having two or more isocyanate groups.

In this document the terms "ethylene oxide moiety", "ethylene oxide group" and "ethylene oxide unit" are used interchangeably, and refer to moieties of the formula ($-CH_2-CH_2-O-$), excluding such moieties that form part of a 1,2-propylene oxide moiety, described by the formula ($-CH_2-CH(CH_3)-O-$).

In this document, the term "polyurethane polymer" refers to polymers prepared by so called diisocyanate polyaddition process. Examples of polyurethane polymers are polyether polyurethanes, polyester polyurethanes, and polyisocyanurates.

The term polyurethane prepolymer" refers to polyurethane polymers comprising one or more unreacted isocyanate groups. The polyurethane prepolymers are obtained by reacting excess of polyisocyanates with polyols and they are polyisocyanates themselves. The terms "isocyanate-functional polyurethane polymer" and "polyurethane prepolymer" are used interchangeably.

In this document, the term "hydrophilic polymer" refers to a polymer having hydrophilic moieties which enable the polymer to be water soluble, miscible or capable of forming an emulsion or paste when mixed with water. The hydrophilic moieties can be referred to as hydrophilic segments, centers or functional groups depending on the nature of the hydrophilic moiety. Preferred hydrophilic moieties include ether functions and ionic groups.

In this document, the term "molecular weight" refers to the molar mass (g/mol) of a molecule or a part of a molecule, also referred to as "moiety". The term "average molecular weight" refers to number average molecular weight ($M_n$) of an oligomeric or polymeric mixture of molecules or moieties.

In this document, the term "shelf life stability" refers to the ability of a composition to be stored at room temperature in a suitable container under exclusion of moisture for a certain time interval, in particular several months, without undergoing significant changes in application or end-use properties.

In this document, an amine or an isocyanate is called "aliphatic" when its amine group or its isocyanate group, respectively, is directly bound to an aliphatic, cycloaliphatic or arylaliphatic moiety. The corresponding functional group is therefore called an aliphatic amine or an aliphatic isocyanate group, respectively.

In this document, an amine or an isocyanate is called "aromatic" when its amine group or its isocyanate group, respectively, is directly bound to an aromatic moiety. The corresponding functional group is therefore called an aromatic amine or an aromatic isocyanate group, respectively.

In this document, the term "primary amine group" refers to an $NH_2$-group bound to an organic moiety, and the term "secondary amine group" refers to a NH-group bound to two organic moieties which together may be part of a ring.

In this document, the term "room temperature" refers to a temperature of ca. 23° C.

A dashed line in the chemical formulas of this document represents the bonding between a moiety and the corresponding rest of the molecule.

The one-component moisture curing composition of the present invention comprises at least one isocyanate-functional polyurethane polymer.

A suitable isocyanate-functional polyurethane polymer may be obtained from the reaction of at least one polyisocyanate with at least one polyol, whereby the isocyanate groups are in stoichiometric excess over hydroxyl groups. The reaction can be carried out via known methods, preferably at temperatures of between 50 and 100° C., optionally in the presence of a catalyst. Preferably, the polyisocyanate is used in such an amount that the ratio of the isocyanate groups to hydroxyl groups in the reaction mixture is in the range of 1.2 to 3.0, more preferably of 1.5 to 3.0. The polyisocyanate and the polyol may optionally be reacted in the presence of a plasticizer and/or a solvent, which are free from isocyanate-reactive groups.

Preferably, the isocyanate-functional polyurethane polymer has a free NCO-group content in the range of 0.5 to 10.0% by weight, more preferably of 1.0 to 5.0% by weight.

Preferably, the isocyanate-functional polyurethane polymer has an average molecular weight in the range of 1,000 to 20,000 g/mol, more preferably in the range of 2,000 to 10,000 g/mol.

Preferably the isocyanate-functional polyurethane polymer has an average isocyanate functionality in the range of 1.5 to 3.0, more preferably of 1.6 to 2.5.

Suitable polyols for preparing the isocyanate-functional polyurethane polymer are polyether polyols, including those containing dispersed styrene-acrylonitrile (SAN), acrylonitrile-methylmethacrylate, or urea particles, further polyester polyols such as products of the polycondensation reaction of diols or triols with lactones or dicarboxylic acids or their esters or anhydrides, further polycarbonate polyols, block copolymer polyols with at least two different blocks of polyether, polyester or polycarbonate units, polyacrylate and polymethacrylate polyols, polyhydroxy-functional fats and oils, especially natural fats and oils, and polyhydrocarbon polyols, such as polyhydroxy-functional polyolefins.

Preferred polyols are diols and triols with an average molecular weight in the range of 500 to 10,000 g/mol, particularly in the range of 1,000 to 5,000 g/mol.

Preferred polyols are polyether polyols, polyester polyols, polycarbonate polyols and polyacrylate polyols.

Particularly preferred polyols are polyether polyols, particularly polyoxyalkylenepolyols.

Polyoxyalkylenepolyols are products of the polymerization of ethylene oxide, 1,2-propylene oxide, 1,2- or 2,3-butylene oxide, oxetane, tetrahydrofuran or mixtures thereof, optionally polymerized using a starter molecule with two or more active hydrogen atoms, such as water, ammonia or compounds with several OH— or NH-groups, such as 1,2-ethanediol, 1,2- and 1,3-propanediol, neopentylglycol, diethyleneglycol, triethyleneglycol, the isomeric dipropylene-glycols and tripropyleneglycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, as well as mixtures of the above-mentioned compounds.

Preferred are both polyoxyalkylenepolyols with a low degree of unsaturation (measured according to ASTM D-2849-69 and indicated in milliequivalents of unsaturation per gram of polyol (meq/g)), obtainable, for example, by using so-called double metal cyanide complex catalysts (DMC catalysts), and polyoxyalkylenepolyols with a higher degree of unsaturation, obtainable, for example, by using anionic catalysts such as NaOH, KOH, CsOH or alkali alcoholates. Particularly preferred polyoxyalkylenepolyols are polymerization products of ethylene oxide and/or propylene oxide.

More preferred are polyoxypropylenepolyols and so-called ethylene oxide end-capped polyoxypropylenepolyols. The latter are specific polyoxypropylene-polyoxyethylenepolyols obtainable by post-ethoxylating pure polyoxypropylenepolyols, thus featuring primary hydroxyl groups.

Particularly preferred are polyoxypropylenediols and -triols and ethylene oxide end-capped polyoxypropylenediols and -triols with an average molecular weight in the range of 500 to 6,000 g/mol, particularly in the range of 1,000 to 5,000 g/mol.

Further particularly preferred polyols are polycarbonate polyols, particularly products of the polycondensation of dialkyl carbonates, diaryl carbonates or phosgene with diols or triols such as ethylene glycol, diethylene glycol, propylene glycol, dipropylene glycol, neopentyl glycol, 1,4-butanediol, 1,5-pentanediol, 3-methyl-1,5-hexanediol, 1,6-hexanediol, 1,8-octanediol, 1,10-decanediol, 1,12-dodecanediol, 1,12-octadecanediol, 1,4-cyclohexane dimethanol, dimeric fatty acid diol (dimeryl diol), hydroxypivalic neopentylglycol ester, glycerol and 1,1,1-trimethylolpropane.

Along with the above-mentioned polyols, small amounts of low molecular weight divalent or multivalent alcohols can be used, such as 1,2-ethanediol, 1,2-propanediol, neopentyl glycol, dibromoneopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimer fatty alcohols, 1,1,1-trimethylolethane, 1,1,1-trimethylolpropane, glycerol, pentaerythritol, sugar alcohols, such as xylitol, sorbitol or mannitol, sugars, such as saccharose, other polyhydric alcohols, low molecular weight alkoxylation products of the above-mentioned divalent or multivalent alcohols, as well as mixtures of the above-mentioned alcohols.

Preferably the isocyanate-functional polyurethane polymer is prepared from a polyol mixture containing at least 50% by weight, more preferably at least 80% by weight, and most preferably at least 90% by weight, of polyether polyols.

Suitable polyisocyanates to obtain the isocyanate-functional polyurethane polymer include:

Aliphatic polyisocyanates, particularly 1,4-tetramethylene diisocyanate, 2-methylpentamethylene-1,5-diisocyanate, 1,6-hexanediisocyanate (HDI), 2,2,4- and 2,4,4-trimethyl-1,6-hexanediisocyanate (TMDI), 1,10-decane-diisocyanate, 1,12-dodecanediisocyanate, lysine or lysine ester diisocyanate, cyclohexane-1,3- and -1,4-diisocyanate, 1-methyl-2,4- and -2,6-diisocyanatocyclohexane and any mixtures of these isomers (H6TDI), 1-isocyanato-3,3,5-trimethyl-5-isocyanatomethyl-cyclohexane (isophoronediisocyanate or IPDI), perhydro-2,4'- and -4,4'-diphenylmethane diisocyanate (H12MDI), 1,4-diisocyanato-2,2,6-trimethylcyclohexane (TMCDI), 1,3- and 1,4-bis-(isocyanatomethyl)cyclohexane, m- and p-xylylene diisocyanate (m- and p-XDI), m- and p-tetramethyl-1,4-xylylene diisocyanate (m- and p-TMXDI), bis-(1-isocyanato-1-methylethyl)naphthalene, dimer or trimer fatty acid isocyanates, such as 3,6-bis-(9-isocyanatononyl)-4,5-di-(1-heptenyl)cyclohexene (dimeryl diisocyanate), and α,α,α',α',α",α"-hexamethyl-1,3,5-mesitylene triisocyanate. Preferred thereof are HDI, TMDI, IPDI and H12MDI, in particular HDI and IPDI, most preferred is IPDI.

Aromatic polyisocyanates, particularly 4,4'-diphenylmethane diisocyanate, 2,4'-diphenylmethane diisocyanate and/or 2,2'-diphenylmethane diisocyanate and any mixtures of these isomers (MDI), 2,4- and/or 2,6-toluylene diisocyanate and any mixtures of these isomers (TDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODI), di-anisidine diisocyanate (DADI), 1,3,5-tris(isocyanatomethyl)benzene, tris-(4-isocyanatophenyl)methane and tris-(4-isocyanatophenyl)thiophosphate. Preferred thereof are MDI and TDI.

It can be advantageous to use mixtures of MDI with oligomers or polymers or derivatives of MDI, preferably so-called modified MDI containing carbodiimides or uretonimines of MDI, which are commercially available, for example, as Desmodur® CD (from Covestro), Lupranate® MM 103 (from BASF) or Isonate® M 143 and Isonate® M 309 (from Dow), as well as so-called polymeric MDI or PMDI representing mixtures of MDI with homologues of MDI, preferably with a low content of MDI homologues, such as Desmodur® VL50 (from Covestro) and Voranate® M 2940 (from Dow). A particularly preferred form of MDI is an MDI isomer mixture comprising 4,4'-diphenylmethane diisocyanate and 2,4'-diphenylmethane diisocyanate in about equal amounts, commercially available for example as Desmodur® 2424 (from Covestro) or Lupranate® MI (from BASF).

Preferably, the at least one inorganic swelling agent is present in the one-component moisture curing composition in an amount in the range of 1.0-35.0% by weight, more preferably 5.0-30.0% by weight, even more preferably 7.5-30.0% by weight, even more preferably 10.0-25.0% by weight, most preferably 12.5-22.5% by weight, based on the total weight of the one-component composition. It may also be preferable that the at least one swelling agent is present in the one-component moisture curing composition in an amount in the range of 1.0-25.0% by weight, more preferably 1.0-22.5% by weight, even more preferably 1.0-12.5% by weight, most preferably 1.0-10.0% by weight, based on the total weight of the one-component composition.

Preferably, the median particle size $d_{50}$ of the inorganic swelling agent is not more than 100 μm, more preferably not more than 50 μm, most preferably not more than 25 μm. In particular, the median particle size $d_{50}$ of the inorganic swelling agent can be in the range of 0.5-100.0 μm, preferably 0.5-50.0 μm, more preferably 1.0-25.0 μm, most preferably 1.0-10.0 μm.

The term median particle size $d_{50}$ refers in this document to a particle size below which 50% of all particles by volume are smaller than the $d_{50}$ value. The term "particle size" refers in this document to the area-equivalent spherical diameter of a particle. The particle size distribution can be measured by laser diffraction according to the method as described in standard ISO 13320:2009. A Mastersizer 2000 device (trademark of Malvern Instruments Ltd, GB) can be used in measuring particle size distribution.

The one-component moisture curing composition of the present invention further comprises at least one hydrophilic aldimine of formula (I).

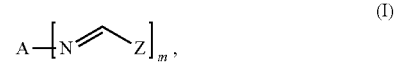

(I)

Preferably, A is a divalent or trivalent hydrocarbyl moiety having an average molecular weight in the range 600 to 4,000 g/mol, preferably from 900 to 2,500 g/mol and having a content of ethylene oxide units of at least 50% by weight, more preferably 50-95% by weight, most preferably 55-90% by weight, based on the weight of A.

According to one or more embodiments of the present invention, A is a divalent or a trivalent hydrocarbyl moiety having an average molecular weight in the range of 600 to 1,000 g/mol containing 50-70% by weight of ethylene oxide units and 30-50% by weight of 1,2-propylene oxide units, the proportions being based on the weight of A.

According to one or more embodiments of the present invention, A is a divalent or a trivalent hydrocarbyl moiety having an average molecular weight in the range of 1,000 to 2,500 g/mol containing 70-90% by weight of ethylene oxide units and 10-30% by weight of 1,2-propylene oxide units, the proportions being based on the weight of A.

Preferably, the hydrophilic aldimine of formula (I) has a content of ethylene oxide units of at least 30% by weight, more preferably at least 40% by weight, in particular 30-90% by weight, preferably 40-85% by weight, based on the weight of the hydrophilic aldimine.

One-component compositions comprising at least one isocyanate-functional polyurethane polymer and at least one hydrophilic aldimine of formula (I) having the ethylene oxide unit content in the above specified ranges have been found to form upon curing water swellable sealants having excellent swelling properties without the use of excessive amounts of inorganic swelling agents. Furthermore, such water-swellable sealants have been found to show decreased shrinkage and good mechanical stability.

Preferably, the at least one hydrophilic aldimine of formula (I) is present in an amount of 1.0-30.0% by weight, more preferably 2.0-25.0% by weight, even more preferably 3.0-20.0% by weight, most preferably 4.0-20.0% by weight, based on the total weight of the one-component moisture curing composition. Water-swellable sealants obtained upon curing of one-component compositions containing hydrophilic aldimines of formula (I) in the amount within the above cited ranges have been found to have excellent swelling properties, decreased shrinkage and good mechanical stability.

Preferably, Z is a substituted or non-substituted aromatic moiety or the hydrophilic aldimine of formula (I) is a hydrophilic aldimine of formula (I a),

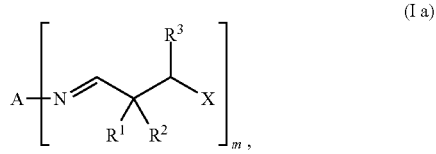

(I a)

wherein
m is 2 or 3,
$R^1$ and $R^2$ are the same or different $C_1$ to $C_{12}$ linear or branched alkyls, or are joined together to form a divalent linear or branched $C_4$ to $C_{12}$ hydrocarbyl moiety which is part of a 5- to 8-membered carbocyclic ring,
$R^3$ is hydrogen or a linear or branched $C_1$ to $C_{12}$ alkyl or arylalkyl or alkoxycarbonyl, and
X is a monovalent moiety of the formulae

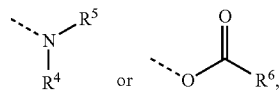

wherein
$R^4$ and $R^5$ are the same or different linear or branched $C_1$ to $C_{20}$ alkyls or cycloalkyls or aralkyls optionally containing ether groups, or are joined together to form a divalent linear or branched $C_4$ to $C_{12}$ hydrocarbyl moiety which is part of a 5- to 8-membered heterocyclic ring which, besides the nitrogen atom, may contain an ether or thioether or tertiary amino group, and
$R^6$ is hydrogen or a monovalent $C_1$ to $C_{20}$ hydrocarbyl moiety optionally containing ether, carbonyl or ester groups.

One-component moisture curing compositions containing hydrophilic aldimines of formula (I a) have been found to cure without releasing significant amounts of carbon dioxide and to provide upon curing low odor or odorless water-swelling sealants having excellent swelling properties, decreased tendency for shrinkage in dry conditions and good mechanical stability.

Preferably, $R^1$ and $R^2$ are each methyl and $R^3$ is hydrogen.
Preferably, $R^4$ and $R^5$ are each a linear or branched $C_1$ to $C_8$ alkyl or cycloalkyl or aralkyl optionally containing ether groups, or are joined together to form a divalent linear or branched $C_4$ to $C_8$ hydrocarbyl moiety which is part of a 5- to 8-membered heterocyclic ring which, besides the nitrogen atom, may contain an ether or thioether or tertiary amino group.

More preferably $R^4$ and $R^5$ are each a methoxyethyl group or are joined together to form, including the nitrogen atom, a morpholine or a 2,6-dimethylmorpholine ring.

Most preferably $R^4$ and $R^5$ form a morpholine ring together with the nitrogen atom.

Preferably $R^6$ is a $C_1$ to $C_{11}$ alkyl, most preferably a methyl or a $C_{11}$ alkyl.

Particularly preferred are hydrophilic aldimines of the formula (I a) wherein $R^1$ and $R^2$ are methyl, $R^3$ is hydrogen and $R^4$ and $R^5$ form a morpholine ring together with the nitrogen atom.

Particularly preferred are further hydrophilic aldimines of the formula (I a) wherein $R^1$ and $R^2$ are methyl, $R^3$ is hydrogen and $R^6$ is a methyl or a $C_{11}$ alkyl.

Particularly preferred hydrophilic aldimines of formula (I a) are N,N'-bis(2,2-dimethyl-3-(N-morpholino)-propylidene)-polyoxyethylene-polyoxypropylenediamines with an average molecular weight in the range from 1,000 to 3,000 g/mol, N,N'-bis(2,2-dimethyl-3-acetoxypropylidene)polyoxyethylene-polyoxypropylenediamines with an average molecular weight in the range of 1,000 to 3,000 g/mol and N,N'-bis(2,2-dimethyl-3-lauroyloxypropylidene)-polyoxyethylene-polyoxypropylenediamines with an average molecular weight in the range of 1,000 to 3,000 g/mol.

In particular, preferred hydrophilic aldimines of formula (I a) are N,N'-bis(2,2-dimethyl-3-(N-morpholino)-propylidene)-polyoxyethylene-polyoxypropylenediamines, N,N'-bis(2,2-dimethyl-3-acetoxypropylidene)polyoxyethylene-polyoxypropylenediamines, and N,N'-bis(2,2-dimethyl-3-lauroyloxypropylidene)-polyoxyethylene-polyoxypropylenediamines containing at least at least 30% by weight, more preferably 30-90% by weight, most preferably 40-85% by weight of ethylene oxide units and having an average molecular weight in the range of 1,000 to 3,000 g/mol.

Such hydrophilic aldimines are based on aminated polyether polyols in the form of propoxylated polyoxyethylene diols, commercially available, for example, as Jeffamine® ED-2003 (from Huntsman). One-component moisture curing compositions containing such hydrophilic aldimines have been found to cure without releasing significant amounts of carbon dioxide and to provide low odor or odorless water-swellable sealants having excellent swelling properties, decreased tendency for shrinkage in dry conditions and good mechanical stability.

The hydrophilic aldimines of the formulae (I) and (I a) are preferably available from a condensation reaction of at least one primary polyamine of the formula (IV) and at least one aldehyde of the formula (V).

(IV)

(V)

In the formulae (IV) and (V), m, A and Z have the already mentioned meanings.

For the condensation reaction, the aldehyde of the formula (V) is used stoichiometrically or in excess related to the primary amino groups of the primary polyamine of the formula (IV). The reaction can advantageously be conducted at a temperature in the range between 15 and 120° C., either in the presence of a solvent or without a solvent. The released water is being removed either azeotropically with a suitable solvent, or directly under vacuum.

Particularly suitable amines of the formula (IV) are hydrophilic polyoxyalkylenediamines and -triamines with an average molecular weight in the range of 600 to 3,000 g/mol, which are commercially available as Jeffamine® ED-600, Jeffamine® ED-900, Jeffamine® ED-2003 (from Huntsman) as well as the corresponding grades from BASF or Nitroil, and further hydrophilic diamines derived from propoxylated polyoxyethylene diols.

Suitable aldehydes of the formula (V) are formaldehyde, acetaldehyde, propanal, 2-methylpropanal, butanal, 2-methylbutanal, 2-ethylbutanal, pentanal, 2-methylpentanal, 3-methylpentanal, 4-methylpentanal, 2,3-dimethylpentanal, hexanal, 2-ethylhexanal, heptanal, octanal, nonanal, decanal, undecanal, 2-methylundecanal, dodecanal, methoxy acetaldehyde, cyclopropane carboxaldehyde, cyclopentane carboxaldehyde, cyclohexane carboxaldehyde; 2,2-dimethyl-3-phenylpropanal, 1-naphthaldehyde, benzaldehyde or substituted benzaldehydes, in particular benzaldehydes substituted with alkyl groups, in particular alkyl groups having 10 to 14 C atoms.

Particularly suitable aldehydes of the formula (V) are isobutyraldehyde, 2-ethylhexanal, pivalaldehyde, 2,2-diethylbutanal, benzaldehyde, 2,2-dimethyl-3-(N,N-bis(methoxyethyl))amino-propanal, 2,2-dimethyl-3-(N-morpholino)-propanal, 2,2-dimethyl-3-(N-(2,6-dimethyl) morpholino)-propanal, 2,2-dimethyl-3-acetoxypropanal, and 2,2-dimethyl-3-lauroyloxypropanal.

Preferred thereof are benzyldehyde, 2,2-dimethyl-3-(N,N-bis(methoxyethyl))amino-propanal, 2,2-dimethyl-3-(N-morpholino)-propanal, 2,2-dimethyl-3-(N-(2,6-dimethyl) morpholino)-propanal, 2,2-dimethyl-3-acetoxypropanal, and 2,2-dimethyl-3-lauroyloxypropanal. Particularly preferred are 2,2-dimethyl-3-(Nmorpholino)-propanal, 2,2-dimethyl-3-acetoxypropanal, and 2,2-dimethyl-3-lauroyloxypropanal.

Preferably, the ratio between the total number of isocyanate-reactive groups from aldimines to the number of isocyanate groups in the one-component composition is in the range of 0.3 to 1.0, preferably 0.4 to 0.9.

Preferably, the at least one isocyanate-functional polyurethane polymer is present in an amount of 10 to 90% by weight, more preferably 30-80% by weight, most preferably 50-70% by weight, based on the total weight of the one-component composition.

According to one or more embodiments, the one-component moisture curing composition further comprises at least one hydrophobic aldimine of formula (II)

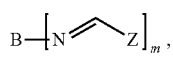

(II)

wherein
B is a divalent or trivalent hydrocarbyl moiety having average molecular weight in the range from 28 to 10,000 g/mol, preferably from 76 to 6,000 g/mol and m and Z have the already mentioned meanings.

The hydrophobic aldimines of the formula (II) is preferably available from a condensation reaction of at least one primary polyamine of the formula (IV) and at least one aldehyde of the formula (V).

Suitable amines of the formula (IV) for the preparation of a hydrophobic aldimine of formula (II) are aliphatic, cycloaliphatic, or arylaliphatic diamines, in particular 1,2-ethanediamine, 1,2-propane diamine, 1,3-propanediamine, 2,2-dimethyl-1,3-propanediamine, 1,3-butanediamine, 1,4-butanediamine, 1,3-pentanediamine (DAMP), 1,5-pentanediamine, 1,5-diamino-2-methylpentane (MPMD), 2-butyl-2-ethyl-1,5-pentanediamine (C11-neodiamine),1,6-hexanediamine, 2,5-dimethyl-1,6-hexanediamine, 2,2(4),4-trimethylhexamethylenediamine (TMD), 1,7-heptanediamine, 1,8-octanediamine, 4-aminomethyl-1,8-octanediamine, 1,11-undecanediamine, 1,12-dodecanediamine, 1,2-,1,3- and 1,4-diaminocyclohexane, 1-amino-3-aminomethyl-3,5,5-trimethylcyclohexane (isophorondiamine), 4(2)-methyl-1,3-diaminocyclohexane, 1,3-bis(aminomethyl)cyclohexane, 1,4-bis(aminomethyl)cyclohexane, bis(4-aminocyclohexyl)methane, bis(4-amino-3-methylcyclohexyl)methane, 2,5(2,6)bis(aminomethyl)bicyclo[2.2.1]heptane (NBDA), 3(4),8(9)-bis(aminomethyl)tricyclo[5.2.1.0$^{2,6}$]decane, 1,4-diamino-2,2,6-trimethylcyclohexane (TMCDA), 1,3-bis(aminomethyl)benzene, 1,4-bis(aminomethyl) benzene;

Aromatic diamines, in particular 1,3- or 1,4-phenylene diamine, 2,4(6)toluylene diamine, and 4,4'-, 2,4'- and 2,2'-diaminodiphenylmethane;

Ether group containing aliphatic diamines, in particular bis(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine and higher oligomers of these diamines as well as polyoxyalkylenedi- and triamines having a molecular weight up to 6,000 g/mol, in particular the ones, which are commercially available from Huntsman as Jeffamine® D-230, D-400, D-2000, D-4000, T-403 and T-5000 as well as the similar compounds available from BASF or Nitroil.

Preferably, the hydrophobic aldimine of formula (II) has a content of ethylene oxide units of not more than 35% by weight, more preferably not more than 25% by weight, most preferably not more than 10% by weight, based on the weight of the hydrophobic aldimine. In particular, the hydrophobic aldimine of formula (II) has a carbon to oxygen ratio of at least 4:1, preferably at least 5:1.

Preferably, the at least one hydrophobic aldimine of formula (II) is present in an amount of 0.5-20.0% by weight, more preferably 0.5-15.0% by weight, even more preferably 1.0-12.5% by weight, most preferably 1.0-10.0% by weight, based on the total weight of the one-component moisture curing composition.

According to one or more embodiments, the at least one hydrophilic aldimine of formula (I) is present in an amount of 0.5-20.0% by weight, preferably 0.5-15.0% by weight, more preferably 1.0-10.0% by weight, most preferably 1.0-7.5 and the at least one hydrophobic aldimine of formula (II) is present in an amount of 0.5-20.0% by weight, preferably 0.5-15.0% by weight, more preferably 1.0-10.0% by weight, most preferably 1.0-7.5% by weight, all proportions being based on the total weight of the one-component moisture curing composition.

Preferably, the one-component moisture curing composition contains less than 10.0% by weight, preferably less than 5.0% by weight, most preferably less than 1.0% by weight, of hydrophilic isocyanate-functional polyurethane polymers. The term "hydrophilic isocyanate-functional polyurethane polymer" refers in this document to isocyanate-functional polyurethane polymers having hydrophilic moieties which enable the polymer to be water soluble, miscible or capable of forming an emulsion or paste when mixed with water. The hydrophilic moieties can be referred to as hydrophilic segments, centers or functional groups depending on the nature of the hydrophilic moiety. Preferred hydrophilic moieties include ether functions and ionic groups.

The hydrophilic isocyanate-functional polyurethane polymers can be obtained, for example, from reaction of polyisocyanates with hydrophilic polyols or from reaction of hydrophilic polyisocyanates with polyols.

Hydrophilic polyols include, for example, polyhydroxy compounds containing polyoxyalkylene groups. Examples thereof include ethoxylated and mixed ethoxylated and propoxylated polyhydroxy compounds as well as dioxolane and dioxane reacted polyhydroxy compounds. Suitable hydrophilic polyols have a carbon to oxygen ratio of not more than 4:1, preferably not more than 3:1, more preferably in the range of 3:1 to 1.5:1.

Preferably, the hydrophilic polyol has a content of ethylene oxide units of at least 25% by weight, preferably at least 30% by weight, most preferably at least 40% by weight, based on the weight of the polyol. In particular, preferred hydrophilic polyols have an average hydroxyl functionality of at least 1.5, preferably between 1.6 and 10, more preferably between 1.7 and 6 and a content of ethylene oxide units of at least 25% by weight, preferably at least 30% by weight, most preferably at least 40% by weight, based on the weight of the polyol.

The hydrophilic polyols include, in particular, hydrophilic polyether polyols, which can be obtained in conventional manner by reacting ethylene oxide or mixtures of ethylene oxide and propylene oxide simultaneously and/or sequentially in any order with an initiator having 2 to 8 active hydrogen atoms, such as water, ethylene glycol, propylene glycol, butanediol, glycerol, trimethyol propane, ethylene diamine, triethanolamine, sucrose and sorbitol. In particular hydrophilic polyether polyols have an average molecular weight of at least 400 g/mol, preferably in the range from 500 to 10,000 g/mol, more preferably from 500 to 5,000 g/mol.

According to one or more embodiments, the one-component moisture curing composition is free of hydrophilic isocyanate-functional polyurethane polymers.

Besides the ingredients already mentioned, the one-component moisture curing composition can comprise further components.

The one-component moisture curing composition preferably comprises a filler, particularly calcium carbonate (chalk), barium sulfates (barytes), slate, silicates (quartz), magnesiosilicates (talc) and alumosilicates (clay, kaolin). These fillers may or may not carry a surface coating, e.g. a stearate or a siloxane coating. Such fillers can increase strength and durability of the water-swellable sealant.

The one-component moisture curing composition preferably comprises at least one metal-based catalyst. Preferred metal-based catalysts are dialkyltin complexes, particularly dibutyltin(IV) or dioctyltin(IV) carboxylates or acetoacetonates, such as dibutyltindilaurate (DBTDL), dibutyltindiacetylacetonate, dioctyltindilaurate (DOTDL), further bismuth(III) complexes such as bismuthoctoate or bismuthneodecanoate, zinc(II) complexes, such as zincoctoate or zincneodecanoate, and zirconium(IV) complexes, such as zirconiumoctoate or zirconiumneodecanoate. Such catalysts can accelerate the reaction of the isocyanate groups.

The one-component moisture curing composition preferably comprises at least one acid catalyst. Preferred acid catalysts are carboxylic acids and sulfonic acids, particularly aromatic carboxylic acids such as benzoic acid or salicylic acid. Such catalysts can accelerate the hydrolysis of aldimino groups.

The one-component moisture curing composition preferably comprises at least one pigment. Preferred pigments are titanium dioxide, iron oxides and carbon black. The pigment defines the color of the sealant, helps to develop strength and can improve durability, particularly UV-stability.

The one-component moisture curing composition may comprise at least one polyisocyanate crosslinker. Preferred polyisocyanate crosslinkers are oligomers and similar derivatives from diisocyanates such as MDI, TDI, HDI and IPDI. Preferred aliphatic polyisocyanate crosslinkers are HDI-biurets, such as Desmodur® N 100 and N 3200 (from Covestro), Tolonate® HDB and HDBLV (from Vencorex) and Duranate® 24A-100 (from Asahi Kasei); HDIisocyanurates, such as Desmodur® N 3300, N 3600 and N 3790 BA (from Covestro), Tolonate® HDT, HDT-LV and HDT-LV2 (from Vencorex), Duranate® TPA-100 and THA-100 (from Asahi Kasei) and Coronate® HX (from Nippon Polyurethane); HDI-uretdiones such as Desmodur® N 3400 (from Covestro); HDI-iminooxadiazinediones such as Desmodur® 3900 (from Covestro); HDI-allophanates such as Desmodur® VP LS 2102 (from Coverstro) and Basonat® HA 100, HA 200 and HA 300 (from BASF); IPDI-isocyanurates such as Desmodur® Z 4470 (from Covestro) and Vestanat® T1890/100 (from Evonik); mixed isocyanurates based on IPDI/HDI, such as Desmodur® NZ 1 (from Covestro). Preferred aromatic polyisocyanate crosslinkers are TDI-oligomers such as Desmodur® IL (from Covestro); modified MDI containing carbodiimides or uretonimines of MDI such as the already mentioned ones; polymeric MDI or PMDI such as the already mentioned ones as well as Desmodur® VL, VL R10, VL R20 (from Covestro), Voranate® M 220, M 229 and M 580 (from Dow) or Lupranate® M 10 R, M 20 S, M 50, M 70 R, and M 200 R (from BASF). Mixed aromatic/aliphatic polyisocyanate crosslinkers may also be used, in particular isocyanurates based on TDI/HDI, such as Desmodur® HL (from Covestro).

Aliphatic polyisocyanate crosslinkers are particularly preferred in one-component moisture curing compositions containing aliphatic isocyanate-functional polyurethane polymers. Particularly preferred are IPDI-isocyanurates and mixed isocyanurates containing IPDI.

Aromatic polyisocyanate crosslinkers are particularly preferred in one-component moisture curing compositions containing aromatic isocyanate-functional polyurethane polymers.

When using such further ingredients it is advantageous to ensure that they do not strongly impair the shelf life stability of the one-component moisture curing composition, i.e. do not massively trigger reactions leading to crosslinking of the polyurethane prepolymer during storage. In particular these further ingredients should not contain any water above trace quantities. It can be advantageous to dry ingredients physically or chemically before use.

The one-component moisture-curing composition may be prepared by mixing all ingredients under exclusion of moisture to obtain a homogeneous paste. It may be stored in a suitable moisture-tight container, particularly a bucket, a drum, a hobbock, a bag, a sausage, a cartridge, a can or a bottle.

Another subject of the present invention is a method of sealing comprising steps of:
i) applying a one-component moisture curing composition according to the present invention to between substrates S1 and S2,
ii) curing the composition by contact with moisture to form a water-swellable sealant between the substrates S1 and S2, the substrates being of same material or of different material.

The curing of the one-component composition starts when it gets in contact with moisture, typically atmospheric moisture. The curing process works by chemical reaction. The aldimino groups are activated with moisture and then react with isocyanate groups. On activation, each aldimino group forms a primary amino group. Furthermore, the isocyanate groups can also react directly with moisture. As a result of these reactions, the composition cures to a water-swellable material, which is a solid, elastic material with a capability to absorb and retain water. The curing process may also be called crosslinking. When contacted with water, the volume of the water-swellable material is increased due to the absorbed water and a swelling pressure is exerted on the surrounding surfaces, which results in further sealing of the space between the substrates against water penetration.

In the course of the curing reaction, the blocking agents of the aldimines, i.e. the aldehydes of formula (V), are released. These blocking agents, depending on their volatility and other factors such as their solubility in the one-component moisture curing composition, may evaporate from the composition during or after curing, or may remain in the cured composition. In the case of aldimines of the formula (I a), the released aldehydes are of low odor and of good compatibility with the polyurethane matrix of the one-component composition. Particularly 2,2-dimethyl-3-(N-morpholino)propanal has an excellent compatibility with the polyurethane matrix, and particularly 2,2-dimethyl-3-lauroyloxypropanal is odorless and remains almost completely in the composition, reducing odor, emission and shrinkage of the water swellable sealant.

Preferably, the water-swellable sealant has a water-absorption capacity of at least 2.5% by weight. The term "water-absorption capacity" refers in this document to the amount of water in weight percentage that the sealant is able to absorb while being stored immersed in water at a temperature of ca. 23° C. for a period of four days, the proportion being based on the weight of the sealant excluding the amount of the absorbed water. In particular, the water-swellable sealant can have a water absorption capacity of at least 5.0% by weight, preferably at least 10.0% by weight, most preferably at least 20.0% by weight of water. Preferably, the water-swellable sealant has a water absorption capacity of not more than 500.0% by weight, more preferably not more than 300% by weight, most preferably not more than 200% by weight.

Still another subject of the present invention is a sealed article produced by using the method of sealing according to the present invention.

Preferably the article is a built structure in construction or civil engineering or a part thereof.

Examples

Preparation of the Aldimines

Aldimine 1: N,N'-bis(2,2-dimethyl-3-lauroyloxypropylidene)-3-aminomethyl-3,5,5-trimethylcyclohexylamine 55.0 g (0.19 mol) distilled 2,2-dimethyl-3-lauroyloxypropanal were placed in a round bottom flask under nitrogen atmosphere. Then 15.6 g (0.18 mol of N) 1-amino-3-aminomethyl-3,5,5-trimethylcyclohexane (IPDA; Vestamin IPD from Evonik, amine content 11.68 mmol N/g) were added slowly under good stirring, followed by removing the volatile contents at 80° C. and 10 mbar vacuum. The yield was 67.1 g of nearly colorless liquid with an amine content of 2.73 mmol N/g, corresponding to a calculated aldimine equivalent weight of approx. 366 g/Eq.

Aldimine 2: N,N'-bis(2,2-dimethyl-3-lauroyloxypropylidene)-polyoxyethylene-polyoxypropylenediamine 2000 g (ca. 2 mol N) polyoxyethylene-polyoxypropylenediamine (Jeffamine® ED-2003 from Huntsman, amine content 1.00 mmol N/g) were molten at 50° C. and reacted with 612 g (2.15 mol) distilled 2,2-dimethyl-3-lauroyloxy-propanal under the same conditions as given for Aldimine 1. The yield was 2575 g of a nearly colourless liquid, which solidified to a waxy solid on standing at room temperature after several hours, with an amine content of 0.78 mmol N/g, corresponding to a calculated aldimine equivalent weight of approx. 1290 g/Eq.

Preparation of the Isocyanate-Functional Polyurethane Polymer 500 g polyoxypropylene diol (Acclaim® 4200 N from Covestro; OH number 28.1 mg KOH/g), 2000 g polyoxypropylenepolyoxyethylene triol (Caradol® MD34-02 from Shell; OH number 35.0 mg KOH/g) and 245 g toluene diisocyanate (Desmodur® T 80 P from Covestro) were reacted at 80° C. to yield an NCO-terminated polyurethane polymer with a free isocyanate group content of 1.88 percent by weight.

Preparation of One-Component Moisture Curing Compositions

For each one-component composition the ingredients given in Table 1 were mixed under exclusion of moisture in a sealed polypropylene beaker by means of a centrifugal mixer (SpeedMixer® DAC 150, FlakTek Inc.) until a homogenous fluid was obtained.

The compositions were stored in tightly sealed, moisture proof cans, for 1-7 days before they were used for testing the swelling properties.

Swelling in Water

For the measurement of the swelling properties, cylindrical test specimens having dimensions of 42 mm (diameter)×6 mm (height) were prepared from each tested composition. The test specimens were cured for 19 days at normal room temperature (23° C., 50% relative humidity). After the curing, the test specimens were stored in tap water at a temperature of 23° C. for 1-4 days. The swelling values presented in Tables 1 and 2 were determined as the percentage change in weight of the test specimen during the storing in water.

The compositions Ex-1 to Ex-11 are compositions according to the invention and the compositions Ref-1 to Ref-8 are comparative examples.

TABLE 1

| wt.-% | Ex-1 | Ex-2 | Ex-3 | Ex-4 | Ex-5 | Ref-1 | Ref-2 | Ref-3 | Ref-4 | Ref-5 | Ref-6 |
|---|---|---|---|---|---|---|---|---|---|---|---|
| Prepolymer TS-21 | 25.5 | 25.5 | 25.5 | 25.5 | 25.5 | 35.0 | 25.5 | 20.0 | 35.0 | 35.0 | 35.0 |
| MgSO$_4$$^a$ | 2.0 | 4.0 | 6.0 | 8.0 | 10.0 | — | — | — | 10.0 | 20.0 | 30.0 |
| Aldimine 1 | — | — | — | — | — | 5.7 | — | — | 5.7 | 5.7 | 5.7 |
| Aldimine 2 | 13.4 | 13.4 | 13.4 | 13.4 | 13.4 | — | 13.4 | 10.5 | — | — | — |
| $^b$Jayflex DIDP | 22.6 | 22.6 | 22.6 | 22.6 | 22.6 | 20.8 | 22.6 | 31.0 | 20.8 | 20.8 | 20.8 |
| $^c$Aerosil 202 | 8.0 | 8.0 | 8.0 | 8.0 | 8.0 | 8.0 | 8.0 | 8.0 | 8.0 | 8.0 | 8.0 |

TABLE 1-continued

| wt.-% | Ex-1 | Ex-2 | Ex-3 | Ex-4 | Ex-5 | Ref-1 | Ref-2 | Ref-3 | Ref-4 | Ref-5 | Ref-6 |
|---|---|---|---|---|---|---|---|---|---|---|---|
| [d]Omyacarb 5GU | 28.0 | 26.0 | 24.0 | 22.0 | 20.0 | 30.0 | 30.0 | 30.0 | 20.0 | 10.0 | — |
| Salicylic acid (5 wt-% in DOA[e]) | 0.5 | 0.5 | 0.5 | 0.5 | 0.5 | 0.5 | 0.5 | 0.5 | 0.5 | 0.5 | 0.5 |
| Swelling 1 day | 34% | 46% | 59% | 73% | 90% | 1% | 20% | 15% | 13% | 13% | 42% |
| Swelling 2 days | 46% | 65% | 86% | 106% | 132% | 1% | 27% | 20% | 20% | 28% | 68% |
| Swelling 3 days | 54% | 78% | 103% | 132% | 162% | 1% | 32% | 22% | 26% | 38% | 86% |
| Swelling 4 days | 56% | 76% | 108% | 142% | 174% | 1% | 35% | 23% | 33% | 51% | 105% |
| Swelling 7 days | 45% | 66% | 93% | 128% | 149% | 1% | 38% | 24% | 45% | 77% | 147% |

[a]Luvomag S700 grinded to a $d_{50}$ median particle size of 5 μm from Lehmann & Voss & Co
[b]plasticizer product containing diisodecyl phthalate from ExxonMobil Chemical
[c]surface-treated fumed silica from Evonik
[d]calcium carbonate from Bassermann minerals
[e]bis (2-ethylhexyl) adipate from Eastman Chemical Company

TABLE 2

| wt.-% | Ex-6 | Ex-7 | Ex-8 | Ex-9 | Ex-10 | Ex-11 | Ref-7 | Ref-8 |
|---|---|---|---|---|---|---|---|---|
| Prepolymer TS-21 | 33.6 | 33.6 | 33.6 | 32.4 | 32.4 | 32.4 | 31.1 | 28.0 |
| MgSO4a | 20 | 16 | 12 | 16 | 14 | 12 | — | — |
| Aldimine 1 | 4.8 | 4.8 | 4.8 | 4 | 4 | 4 | 3.35 | 1.5 |
| Aldimine 2 | 2 | 2 | 2 | 4 | 4 | 4 | 5.5 | 9.9 |
| [b]Jayflex DIDP | 21.1 | 21.1 | 21.1 | 21.1 | 21.1 | 21.1 | 21.55 | 22.1 |
| [c]Aerosil 202 | 8 | 8 | 8 | 8 | 8 | 8 | 8 | 8 |
| [d]Omyacarb 5GU | 10 | 14 | 18 | 14 | 16 | 18 | 30.0 | 30.0 |
| Salicylic acid (5 wt-% in DOA[e]) | 0.5 | 0.5 | 0.5 | 0.5 | 0.5 | 0.5 | 0.5 | 0.5 |
| Swelling 1 day | 27% | 22% | 17% | 32% | 29% | 26% | 2% | 7% |
| Swelling 2 days | 44% | 37% | 29% | 50% | 47% | 41% | 2% | 9% |
| Swelling 3 days | 58% | 49% | 38% | 70% | 54% | 45% | 3% | 10% |
| Swelling 4 days | 70% | 60% | 47% | 84% | 66% | 54% | 3% | 12% |
| Swelling 7 days | 102% | 95% | 69% | 128% | 117% | 103% | 4% | 16% |

[a]Luvomag S700 grinded to a $d_{50}$ median particle size of 5 μm from Lehmann & Voss & Co
[b]plasticizer product containing diisodecyl phthalate from ExxonMobil Chemical
[c]surface-treated fumed silica from Evonik
[d]calcium carbonate from Bassermann minerals
[e]bis (2-ethylhexyl) adipate from Eastman Chemical Company

The invention claimed is:

1. A one-component moisture curing composition comprising:
   a) at least one isocyanate-functional polyurethane polymer,
   b) at least one inorganic swelling agent selected from the group consisting of aluminum sulfate and magnesium sulfate, and
   c) at least one hydrophilic aldimine of the formula (I);

(I)

wherein
   m is 2 or 3
   A is a divalent or trivalent hydrocarbyl moiety having a content of ethylene oxide units of 50.0-95.0% by weight, based on the weight of A, and having average molecular weight in the range from 600 to 4,000 g/mol, and
   Z is a monovalent $C_3$ to $C_{30}$ hydrocarbyl moiety optionally containing ether, carbonyl, ester, amido, urethane, urea or tertiary amino groups.

2. The one-component moisture curing composition according to claim 1, wherein the total amount of the at least one inorganic swelling agent is in the range of 1.0-35.0% by weight, based on the total weight of the one-component composition.

3. The one-component moisture curing composition according to claim 1, wherein the hydrophilic aldimine of formula (I) has a content of ethylene oxide units of at least 30.0% by weight, based on the weight of the hydrophilic aldimine.

4. The one-component moisture curing composition according to claim 1, wherein the at least one hydrophilic aldimine of formula (I) is present in an amount of 1.0-30.0% by weight, based on the total weight of the one-component moisture curing composition.

5. The one-component moisture curing composition according to claim 1, wherein the at least one hydrophilic aldimine of the formula (I) is a hydrophilic aldimine of the formula (I a),

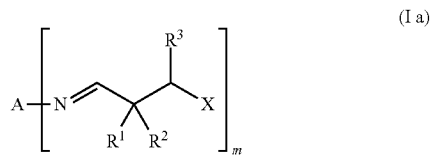

(I a)

wherein
   $R^1$ and $R^2$ are the same or different $C_1$ to $C_{12}$ linear or branched alkyls, or are joined together to form a divalent linear or branched $C_4$ to $C_{12}$ hydrocarbyl moiety which is part of a 5- to 8-membered carbocyclic ring;

$R^3$ is hydrogen or a linear or branched $C_1$ to $C_{12}$ alkyl or arylalkyl or alkoxycarbonyl; and X is a monovalent moiety of the formulae

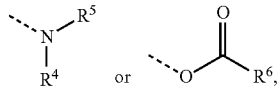

wherein $R^4$ and $R^5$ are the same or different linear or branched $C_1$ to $C_{20}$ alkyls or cycloalkyls or aralkyls optionally containing ether groups, or are joined together to form a divalent linear or branched $C_4$ to $C_{12}$ hydrocarbyl moiety which is part of a 5- to 8-membered heterocyclic ring which, besides the nitrogen atom, may contain an ether or thioether or tertiary amino group, and $R^6$ is hydrogen or a monovalent $C_1$ to $C_{20}$ hydrocarbyl moiety optionally containing ether, carbonyl or ester groups.

6. The one-component moisture curing composition according to claim 1, wherein the hydrophilic aldimine of formula (I) is selected from the group consisting of N,N'-bis(2,2-dimethyl-3-(N-morpholino)-propylidene)-polyoxyethylene-polyoxypropylenediamines with an average molecular weight in the range of 1,000 to 3,000 g/mol, N,N'-bis(2,2-dimethyl-3-acetoxypropylidene)-polyoxyethylene-polyoxypropylenediamines with an average molecular weight in the range of 1,000 to 3,000 g/mol, and N,N'-bis(2,2-dimethyl-3-lauroyl-oxypropylidene)-polyoxyethylene-polyoxypropylenediamines with an average molecular weight in the range of 1,000 to 3,000 g/mol.

7. The one-component moisture curing composition according to claim 1, wherein the ratio between the total number of isocyanate-reactive groups from aldimines to the number of isocyanate groups in the one-component composition is in the range of 0.3 to 1.0.

8. The one-component moisture curing composition according to claim 1, wherein the at least one isocyanate-functional polyurethane polymer is present in an amount of 10-90% by weight, based on the total weight of the one-component composition.

9. The one-component moisture curing composition according to claim 1 further comprising at least one hydrophobic aldimine of formula (II);

wherein m is 2 or 3

B is a divalent or trivalent hydrocarbyl moiety having average molecular weight in the range from 28 to 10,000 g/mol, and Z is a monovalent $C_3$ to $C_{30}$ hydrocarbyl moiety optionally containing ether, carbonyl, ester, amido, urethane, urea or tertiary amino groups.

10. The one-component moisture curing composition according to claim 9, wherein the hydrophobic aldimine of formula (II) has a content of ethylene oxide units of not more than 35.0% by weight, based on the weight of the hydrophobic aldimine.

11. The one-component moisture curing composition according to claim 1 containing less than 5.0% by weight of hydrophilic isocyanate-functional polyurethane polymers.

12. A method of sealing comprising steps of:
i) applying a composition according to claim 1 to between substrate S1 and S2,
ii) curing the composition by contact with moisture to form a water-swellable sealant between the substrates S1 and S2, the substrates being of same material or of different material.

13. A sealed article produced by using the method according to claim 12.

14. The sealed article according to claim 13, wherein the article is a built structure in construction or civil engineering or a part thereof.

* * * * *